(12) United States Patent
Castillo

(10) Patent No.: US 12,054,086 B2
(45) Date of Patent: Aug. 6, 2024

(54) FOLDABLE RAMP FOR A PICKUP TRUCK

(71) Applicant: GM Global Technology Operations LLC, Detroit, MI (US)

(72) Inventor: Brian V. Castillo, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 166 days.

(21) Appl. No.: 17/863,547

(22) Filed: Jul. 13, 2022

(65) Prior Publication Data

US 2024/0017657 A1  Jan. 18, 2024

(51) Int. Cl.
*B60P 1/43* (2006.01)

(52) U.S. Cl.
CPC .................................. *B60P 1/435* (2013.01)

(58) Field of Classification Search
CPC .... B60P 1/435; B60P 1/43; B60P 1/10; B62D 33/02
See application file for complete search history.

(56) References Cited

U.S. PATENT DOCUMENTS

| | | | | |
|---|---|---|---|---|
| 4,668,002 A | * | 5/1987 | Hanson | B60P 1/435 296/61 |
| 2007/0289073 A1 | * | 12/2007 | Williams | B65G 69/30 14/69.5 |
| 2012/0297558 A1 | * | 11/2012 | Wang | B65G 69/30 72/324 |

FOREIGN PATENT DOCUMENTS

CA    2441358 A1 *  3/2004  ............. B60P 1/435

* cited by examiner

*Primary Examiner* — Saul Rodriguez
*Assistant Examiner* — Lucia Elba Rodriguez
(74) *Attorney, Agent, or Firm* — CANTOR COLBURN LLP

(57) ABSTRACT

A foldable ramp includes a first ramp element including a first end, a second end, and a first ramp surface extending between the first end and the second end, a second ramp element including a first end portion, a second end portion, and a second ramp surface extending between the first end portion and the second end portion, and a hinge connecting the second end of the first ramp element and the second end portion of the second ramp element. A first tension element has a first end section connected to the first end and a second end section. A second tension element has a first end segment pivotally connected to the first end portion and a second end segment connected to the second end section.

19 Claims, 5 Drawing Sheets

FOLDABLE RAMP FOR A PICKUP TRUCK

INTRODUCTION

The subject disclosure relates to the art of vehicles and, more particularly, to a foldable ramp for a pickup truck.

Pickup trucks are often used to transport other vehicles such as all-terrain vehicles (ATV's), motorcycles, lawn mowers, and the like. Over the years, various methods for moving the vehicle into a pickup truck bed have been developed. The vehicle may be physically lifted into the truck bed, the vehicle and the truck bed may be arranged at similar heights such as through the use of a loading dock, a platform, or raised area of earth, or ramps may be used.

Ramps allow the vehicle to be driven, pushed, or pulled into the truck bed. Longer ramps, while difficult to transport in a pickup truck, provide a low angle or easier path into the truck bed. Shorter ramps that may be easily stored in the truck bed create a high angle path that may increase loading difficulty. Thus, there is a tradeoff between a high angled ramp that can fit in the truck bed, and a low angle ramp that is difficult to transport. This trade-off led to the development of a folding ramp.

The folding ramp can be folded for easy transport and unfolded to create a low angle approach to the vehicle bed. While effective, the folding ramps have a limited weight bearing capacity. Increasing the weight bearing capacity often necessitates the use of heavier materials, or thicker, more robust, structural profiles that are more difficult for a single person to handle and less amenable to storage in the truck bed. Accordingly, it is desirable to provide a foldable ramp that creates a low angle approach to a truck bed and also possesses a weight bearing capacity sufficient for most transportable vehicles without the need for heavier materials.

SUMMARY

A foldable ramp, in accordance with a non-limiting example, includes a first ramp element including a first end, a second end, and a first ramp surface extending between the first end and the second end, a second ramp element including a first end portion, a second end portion, and a second ramp surface extending between the first end portion and the second end portion, and a hinge connecting the second end of the first ramp element and the second end portion of the second ramp element. A first tension element has a first end section connected to the first end and a second end section. A second tension element has a first end segment pivotally connected to the first end portion and a second end segment connected to the second end section.

In addition to one or more of the features described herein a support member extends between the hinge and the first tension element and the second tension element.

In addition to one or more of the features described herein the support member extends along the second end and the second end portion.

In addition to one or more of the features described herein the first tension element includes a first tension member pivotally connected to the first end and a second tension member pivotally connected with the support member.

In addition to one or more of the features described herein the second tension element includes a third tension member pivotally connected to the first end portion and a fourth tension member pivotally connected with the support member.

In addition to one or more of the features described herein a hinge member connected to the support member, the second tension element, and the fourth tension member are connected with the support member through the hinge member.

In addition to one or more of the features described herein a first hinge element connects the first tension element and the second tension element.

In addition to one or more of the features described herein a second hinge element connects the third tension member and the fourth tension member.

In addition to one or more of the features described herein one of the first hinge element and the second hinge element includes a stop member.

In addition to one or more of the features described herein one of the first hinge element and the second hinge element includes a spring.

A pickup truck in accordance with a non-limiting example, includes a body including a passenger compartment and a cargo bed. The cargo bed includes a forward wall, a first side wall, a second side wall, a bed surface, and a tail gate. A foldable ramp is mounted in the cargo bed to one of the first side wall and the second side wall. The foldable ramp includes a first ramp element including a first end, a second end, and a first ramp surface extending between the first end and the second end, and a second ramp element including a first end portion, a second end portion, a second ramp surface extending between the first end portion and the second end portion, and a hinge connecting the second end of the first ramp element and the second end portion of the second ramp element. A first tension element has a first end section connected to the first end and a second end section. A second tension element having a first end segment connected to the first end portion and a second end segment connected to the second end section.

In addition to one or more of the features described herein a support member extending between the hinge and the first tension element and the second tension element.

In addition to one or more of the features described herein wherein the support member extends along the second end and the second end portion.

In addition to one or more of the features described herein the first tension element includes a first tension member pivotally connected to the first end and a second tension member pivotally connected with the support member.

In addition to one or more of the features described herein the second tension element includes a third tension member pivotally connected to the first end portion and a fourth tension member pivotally connected with the support member.

In addition to one or more of the features described herein a hinge member is connected to the support member, the second tension element, and the fourth tension member are connected with the support member through the hinge member.

In addition to one or more of the features described herein a first hinge element connects the first tension element and the second tension element.

In addition to one or more of the features described herein a second hinge element connects the third tension member and the fourth tension member.

In addition to one or more of the features described herein one of the first hinge element and the second hinge element includes a stop member.

In addition to one or more of the features described herein one of the first hinge element and the second hinge element includes a spring.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
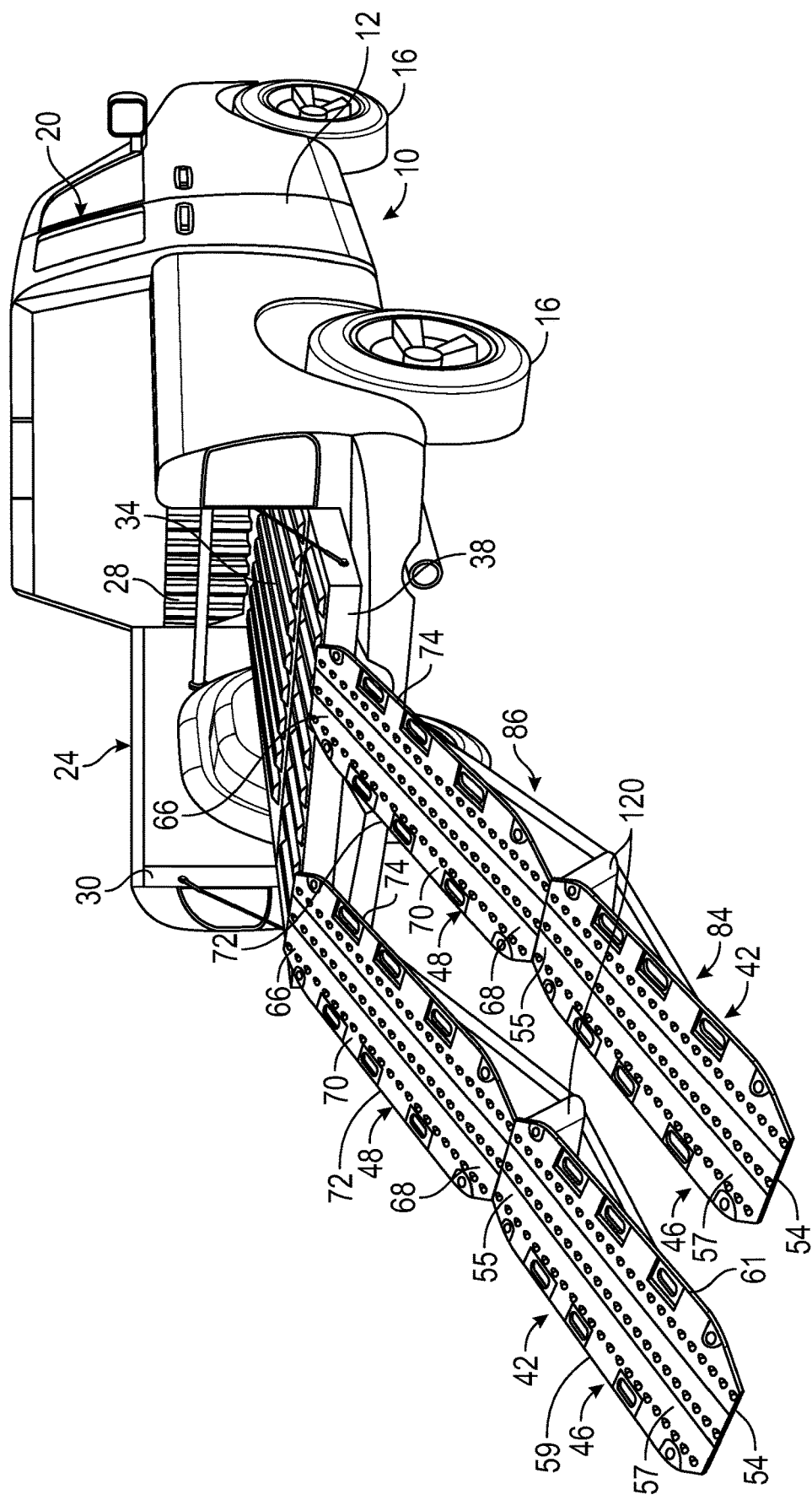
FIG. 1 is a rear view of a pickup truck including a foldable ramp shown in a deployed configuration, in accordance with a non-limiting example.

The following description is merely exemplary in nature and is not intended to limit the present disclosure, its application or uses. It should be understood that throughout the drawings, corresponding reference numerals indicate like or corresponding parts and features.

Figure 2:
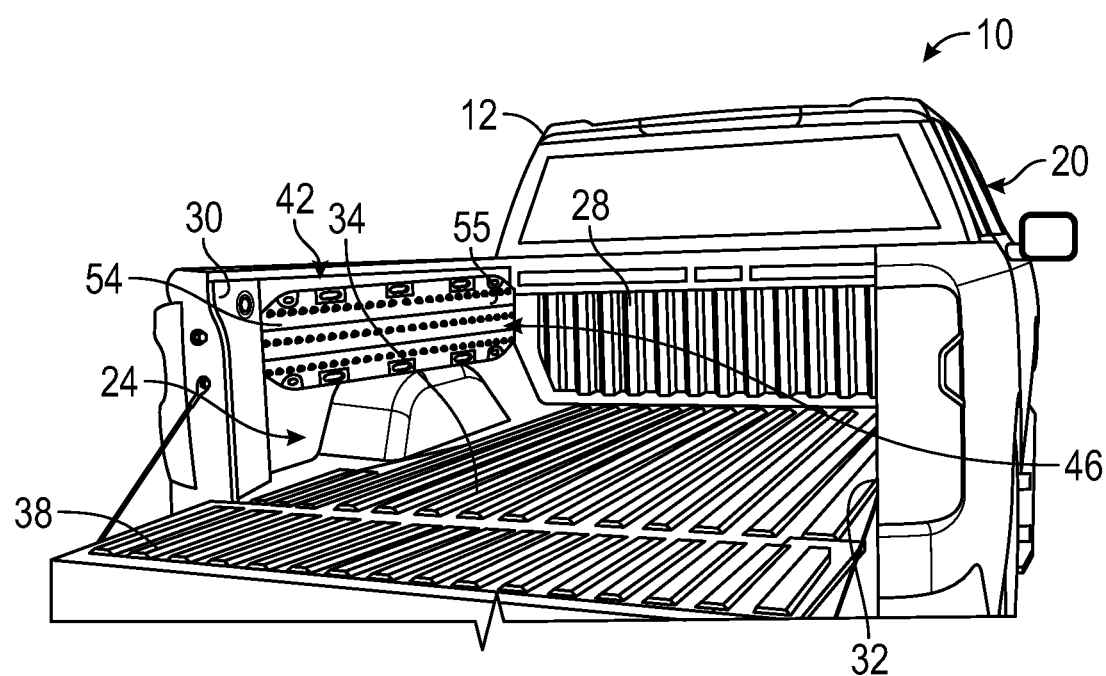
FIG. 2 depicts the foldable ramp of FIG. 1 in a folded configuration and connected to the pickup truck, in accordance with a non-limiting example.

A pickup truck, in accordance with a non-limiting example, is indicated generally at 10 in FIGS. 1 and 2. Pickup truck 10 includes a body 12 supported by a plurality of wheels, two of which are indicated at 16. Body 12 includes a passenger compartment 20 and a cargo bed 24. Cargo bed 24 includes a forward wall 28, a first side wall 30, a second side wall 32 (FIG. 2), and a bed surface 34. Cargo bed 24 also includes a tail gate 38 that defines a rear wall (not separately labeled). A foldable ramp 42, in accordance with a non-limiting example, is shown mounted to first side wall 30 in FIG. 2. Foldable ramp 42 may be formed from metal, metallic compounds, and non-metal materials.

Figure 3A:
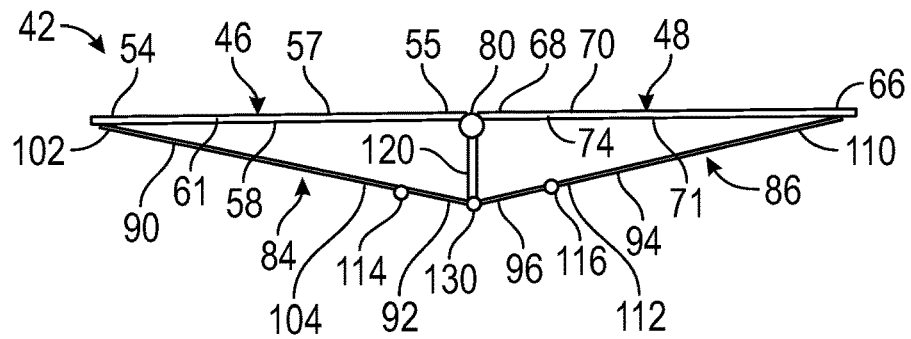
FIG. 3A is a side view of the foldable ramp in the deployed configuration, in accordance with a non-limiting example.

In a non-limiting example shown in FIGS. 2 and 3A, foldable ramp 42 includes a first ramp element 46 pivotally connected to a second ramp element 48. First ramp element 46 includes a first end 54, a second end 55, and a first ramp surface 57 and a first opposing surface 58. First ramp surface 57 includes a first lateral side 59 and a second lateral side 61. Second ramp element 48 includes a first end portion 66, a second end portion 68, a second ramp surface 70, and a second opposing surface 71. Second ramp surface 70 includes a first lateral side portion 72 and a second lateral side portion 74. A hinge 80 joins second end 55 with second end portion 68.

Figure 4:
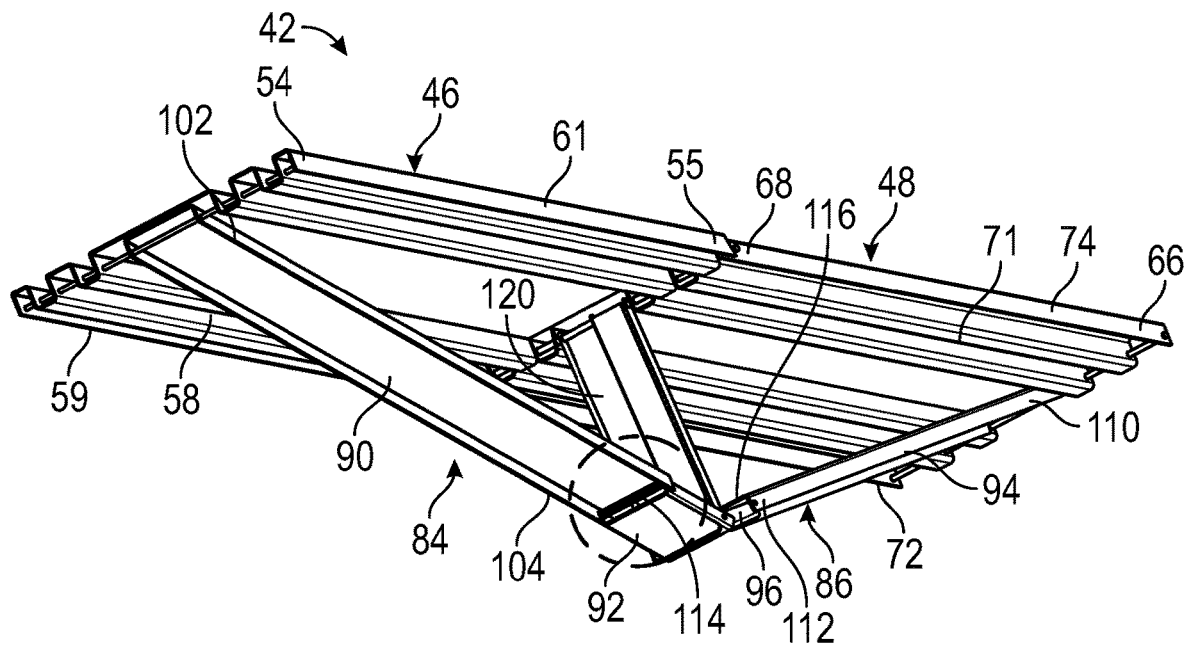
FIG. 4 depicts a lower left perspective view of the foldable ramp of FIG. 1 in accordance with a non-limiting example.

In a non-limiting example, a first tension member 84 extends from first end 54 toward second end 55. A second tension member 86 extends from first end portion 66 toward second end portion 68. As shown in FIG. 4, first tension member 84 includes a first tension element 90 and a second tension element 92. Similarly, second tension member 86 includes a third tension element 94 and a fourth tension element 96.

First tension element 90 includes a first end section 102 connected with first end 54 of first ramp element 46 and a second end section 104 connected to second tension element 92. Third tension element 94 includes a first end segment 110 connected with first end portion 66 of second ramp element 48 and a second end segment 112 connected to fourth tension element 96. A first hinge element 114 links second end section 104 of first tension element 90 and second tension element 92. A second hinge element 116 links second end segment 112 of third tension element 94 with fourth tension element 96. A support member 120 is pivotally connected with second tension element 92 and fourth tension element 96 as will be detailed herein.

As shown in FIG. 4, support member 120 extends along second end 55 of first ramp element 46 and second end portion 68 of second ramp element 48 and is connected with second tension element 92, and fourth tension element 96. With this arrangement, first and second tension members 84 and 86 together with support member 120 provide structural support for foldable ramp 42 when deployed such as shown in FIG. 1. In a non-limiting example, a hinge member 130 connects second tension element 92 and fourth tension element 96 with support member 120. Hinge 80 also connects second end 55 and second end portion 68 with support member 120.

Figure 3B:
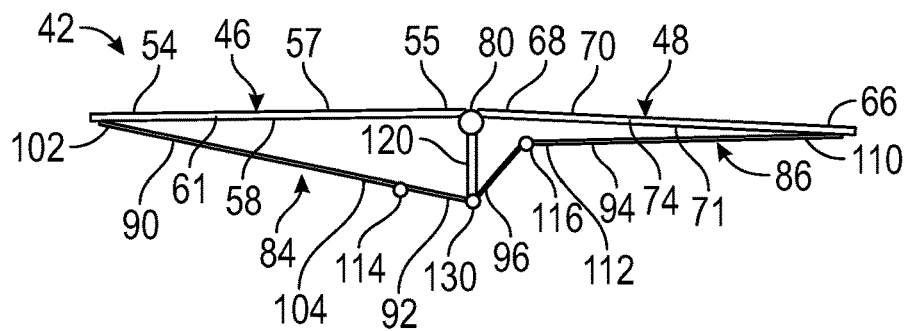
FIG. 3B depicts the foldable ramp of FIG. 3A with a first tension member being folded, in accordance with a non-limiting example.
Figure 3C:
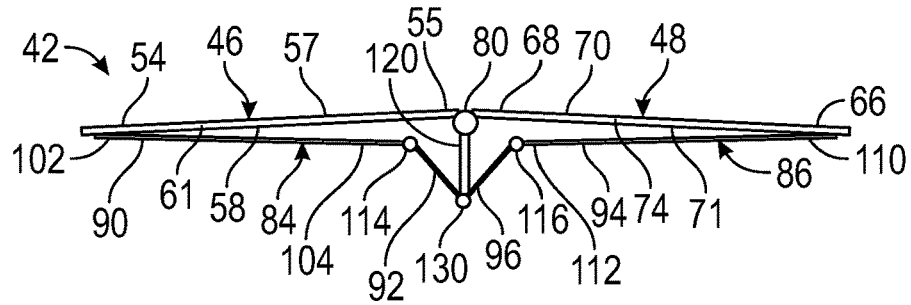
FIG. 3C depicts the foldable ramp of FIG. 3B with a second tension member being folded, in accordance with a non-limiting example.
Figure 3D:
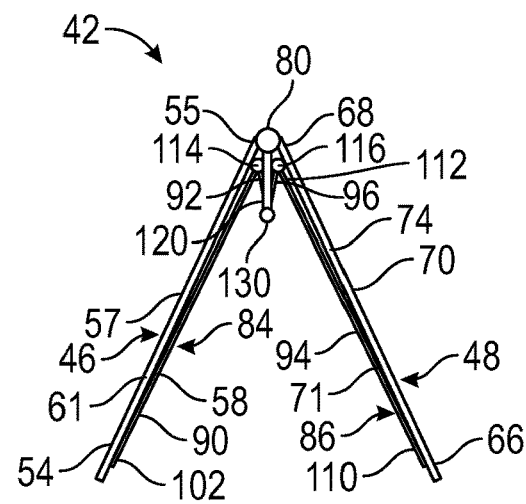
FIG. 3D depicts the foldable ramp of FIG. 3C in the folded configuration, in accordance with a non-limiting example.

Foldable ramp 42 may be folded about hinge 80 as will be described herein. As shown in FIG. 3B, third tension element 94 and fourth tension element 96 may be folded about second hinge element 116. Second hinge element 116 is urged toward hinge 80. In FIG. 3C, first tension element 90 and second tension element 92 may be folded about first hinge element 114. That is, first hinge element 114 may be urged toward hinge 80. At this point, first ramp element 46 and second ramp element 48 may be brought together as shown in FIG. 3D. Foldable ramp 42 may then be mounted to first side wall 30 or may be stored elsewhere.

Figure 5:
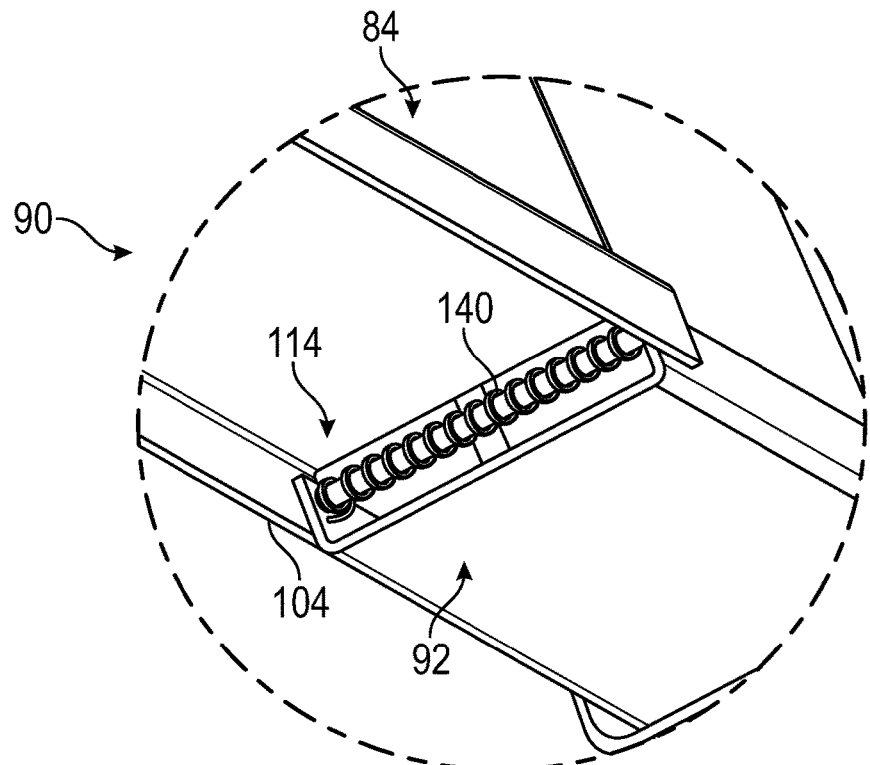
FIG. 5 depicts a hinge element including a biasing spring on the first tension member of the ramp, in accordance with a non-limiting example.
Figures 6A, 6B:
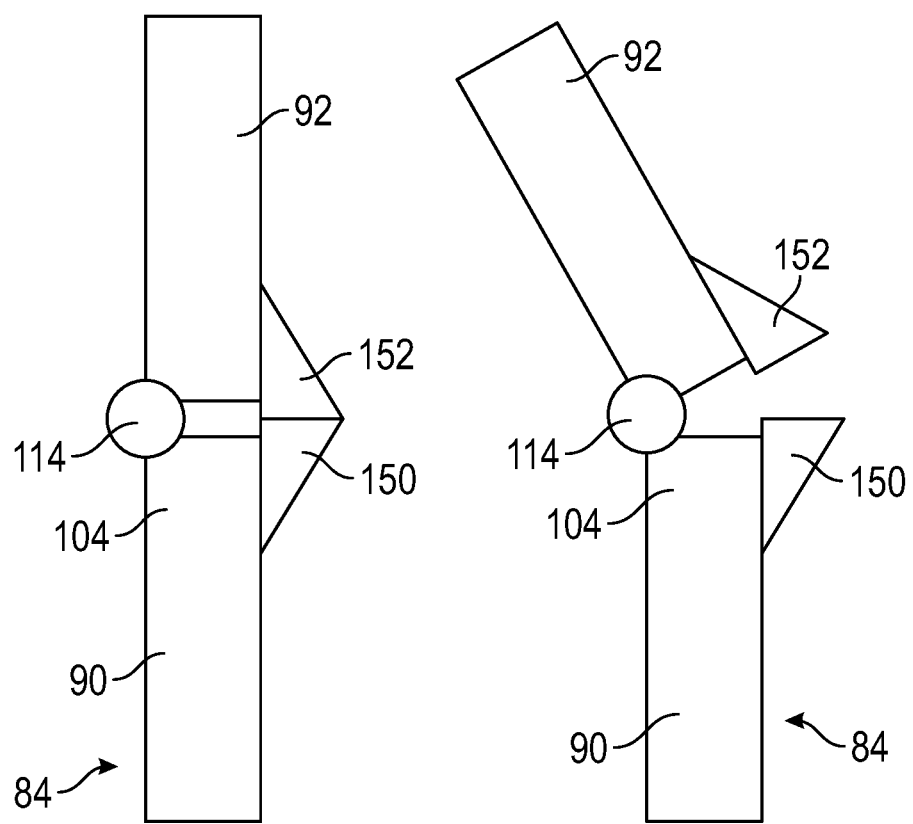
FIG. 6A depicts stop members limiting travel of the first tension member, in accordance with a non-limiting example.
FIG. 6B depicts the stop members separating as the first tension member is folded, in accordance with a non-limiting example.

In a non-limiting example shown in FIG. 5, first hinge element 114 may include a spring 140 that provides a biasing force that collapses first tension member 84. Second hinge element 116 includes similar structure. Further, first tension element 90 and second tension element 92 may include corresponding stop members 150 and 152 that limit an overall outward pivot of hinge 114 element. That is, stop member 150 and stop member 152 may engage as shown in FIG. 6A when foldable ramp 42 is deployed and may separate as shown in FIG. 6B when foldable ramp 42 is folded.

At this point, it should be appreciated that the foldable ramp, formed in accordance with the non-limiting examples described herein, represents a lightweight ramp that creates a low angle approach to a cargo bed of a pickup truck. The weight of the ramp facilitates easy deployment while the low angle approach allows for easy loading and unloading of vehicles. Further, it should be understood that the tension members provide structural support/rigidity and strength when deployed while, at the same time, facilitating a transition to a more compact size for storage.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A foldable ramp comprising:
   a first ramp element including a first end, a second end, and a first ramp surface extending between the first end and the second end;
   a second ramp element including a first end portion, a second end portion, and a second ramp surface extending between the first end portion and the second end portion;
   a hinge connecting the second end of the first ramp element and the second end portion of the second ramp element;
   a first tension element having a first end section connected to the first end and a second end section;
   a second tension element having a first end segment connected to the first end portion and a second end segment connected to the second end section;
   a support member extending between the hinge and the first tension element and the second tension element, wherein the first tension element includes a first tension member pivotally connected to the first end and a second tension member pivotally connected with the support member and the second tension element includes a third tension member pivotally connected to the first end portion and a fourth tension member pivotally connected with the support member; and
   a hinge member connected to the support member, the second tension element, and the fourth tension member are connected with the support member through the hinge member.

2. The foldable ramp according to claim 1, wherein the support member extends along the second end and the second end portion.

3. The foldable ramp according to claim 1, further comprising a first hinge element connecting the first tension element and the second tension element.

4. The foldable ramp according to claim 3, further comprising a second hinge element connecting the third tension member and the fourth tension member.

5. The foldable ramp according to claim 4, wherein one of the first hinge element and the second hinge element includes a stop member.

6. The foldable ramp according to claim 4, wherein one of the first hinge element and the second hinge element includes a spring.

7. A pickup truck comprising:
   a body including a passenger compartment and a cargo bed, the cargo bed including a forward wall, a first side wall, a second side wall, a bed surface, and a tail gate; and
   a foldable ramp mounted in the cargo bed to one of the first side wall and the second side wall, the foldable ramp comprising:
   a first ramp element including a first end, a second end, and a first ramp surface extending between the first end and the second end;
   a second ramp element including a first end portion, a second end portion, and a second ramp surface extending between the first end portion and the second end portion;
   a hinge connecting the second end of the first ramp element and the second end portion of the second ramp element;
   a first tension element having a first end section connected to the first end and a second end section;
   a second tension element having a first end segment connected to the first end portion and a second end segment connected to the second end section;
   a support member extending between the hinge and the first tension element and the second tension element, wherein the first tension element includes a first tension member pivotally connected to the first end and a second tension member pivotally connected with the support member and the second tension element includes a third tension member pivotally connected to the first end portion and a fourth tension member pivotally connected with the support member; and
   a hinge member connected to the support member, the second tension element, and the fourth tension member are connected with the support member through the hinge member.

8. The pickup truck according to claim 7, wherein the support member extends along the second end and the second end portion.

9. The pickup truck according to claim 7, further comprising a first hinge element connecting the first tension element and the second tension element.

10. The pickup truck according to claim 9, further comprising a second hinge element connecting the third tension member and the fourth tension member.

11. The pickup truck according to claim 10, wherein one of the first hinge element and the second hinge element includes a stop member.

12. The pickup truck according to claim 10, wherein one of the first hinge element and the second hinge element includes a spring.

13. A pickup truck comprising:
    a foldable ramp mounted in a cargo bed of the pickup truck, the foldable ramp comprising:
    a first ramp element including a first end, a second end, and a first ramp surface extending between the first end and the second end;
    a second ramp element including a first end portion, a second end portion, and a second ramp surface extending between the first end portion and the second end portion;
    a hinge connecting the second end of the first ramp element and the second end portion of the second ramp element;
    a first tension element having a first end section connected to the first end and a second end section;
    a second tension element having a first end segment connected to the first end portion and a second end segment connected to the second end section;
    a support member extending between the hinge and the first tension element and the second tension element, wherein the first tension element includes a first tension member pivotally connected to the first end and a second tension member pivotally connected with the support member and the second tension element includes a third tension member pivotally connected to the first end portion and a fourth tension member pivotally connected with the support member; and a hinge member connected to the support member, the second tension element, and the fourth tension member are connected with the support member through the hinge member.

14. The pickup truck according to claim 13, wherein the support member extends along the second end and the second end portion.

15. The pickup truck according to claim 13, further comprising a first hinge element connecting the first tension element and the second tension element.

16. The pickup truck according to claim 15, further comprising a second hinge element connecting the third tension member and the fourth tension member.

17. The pickup truck according to claim 16, wherein one of the first hinge element and the second hinge element includes a stop member.

18. The pickup truck according to claim 16, wherein one of the first hinge element and the second hinge element includes a spring.

19. The pickup truck according to claim 13, wherein the foldable ramp is mounted to a first side wall of the cargo bed.

* * * * *